United States Patent
Peruru et al.

(10) Patent No.: US 12,407,466 B2
(45) Date of Patent: Sep. 2, 2025

(54) ENHANCING THROUGHPUT PERFORMANCE IN MULTI-SIM MODEMS

(71) Applicant: QUALCOMM Incorporated, San Diego, CA (US)

(72) Inventors: Praveen Peruru, San Diego, CA (US); Karthikeyan Sabapathi, Hyderabad (IN); Mahender Reddy Akkapally, Hyderabad (IN); Sarfraz Mohammed Ghani, Hyderabad (IN); Harinath Reddy Patel, Hyderabad (IN); Pankaj Shivcharan Gupta, Hyderabad (IN); Akash Srivastava, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 17/576,853

(22) Filed: Jan. 14, 2022

(65) Prior Publication Data
US 2023/0231681 A1    Jul. 20, 2023

(51) Int. Cl.
*H04L 5/00* (2006.01)
*H04L 1/00* (2006.01)
(Continued)

(52) U.S. Cl.
CPC .......... *H04L 5/0051* (2013.01); *H04L 1/0025* (2013.01); *H04W 8/18* (2013.01); *H04W 72/1263* (2013.01)

(58) Field of Classification Search
CPC ..... H04L 5/003; H04L 5/0048; H04L 5/0051; H04L 1/0001; H04L 1/0023;
(Continued)

(56) References Cited

U.S. PATENT DOCUMENTS

| 2014/0119293 A1* | 5/2014 | Sikri | H04W 60/005 370/329 |
| 2016/0050686 A1* | 2/2016 | Krishnamoorthi | H04W 28/04 455/418 |

(Continued)

OTHER PUBLICATIONS

3GPP, "Physical layer procedures for data (Release 16)", Dec. 2021, 3GPP TS 38.214 V16.8.0, pp. 135-140 (Year: 2021).*
(Continued)

*Primary Examiner* — Paul H. Masur
(74) *Attorney, Agent, or Firm* — Holland & Hart LLP

(57) ABSTRACT

Methods, systems, and devices for wireless communications are described. A user equipment (UE) may switch the set of antennas that the UE uses to transmit sounding reference signal (SRS) transmissions. For example, the UE may switch from transmitting first SRSs that conflict with a scheduled communication from a first set of antennas to a second set of antennas (e.g., that is, the conflict may be at the first set of antennas). The UE may be transmitting second SRSs using the second set of antennas, and the switching may cause the UE to transmit the second SRSs using the first set of antennas instead. The second SRSs may not conflict with the scheduled communication (e.g., due to using different resources than the first SRSs), which may enable the UE to transmit the second SRSs and the scheduled communication using the same first set of antennas.

30 Claims, 10 Drawing Sheets

(51) Int. Cl.
H04W 8/18 (2009.01)
H04W 72/1263 (2023.01)

(58) Field of Classification Search
CPC ...... H04L 1/0025; H04L 5/0023; H04W 8/18; H04W 72/12; H04W 72/1263–1273
See application file for complete search history.

(56) References Cited

U.S. PATENT DOCUMENTS

| | | | | |
|---|---|---|---|---|
| 2018/0070303 | A1* | 3/2018 | Tambaram Kailasam | ............... H04L 69/28 |
| 2020/0145929 | A1* | 5/2020 | Ryu | ............... H04W 52/242 |
| 2021/0112399 | A1* | 4/2021 | Gopal | ............... H04L 5/0048 |
| 2021/0235386 | A1* | 7/2021 | Zhang | ............... H04W 52/42 |
| 2021/0384949 | A1* | 12/2021 | Kumar | ............... H04W 76/15 |
| 2022/0116172 | A1* | 4/2022 | Tang | ............... H04L 5/0007 |
| 2022/0353042 | A1* | 11/2022 | Gao | ............... H04W 16/28 |
| 2023/0146637 | A1* | 5/2023 | Goddeti | ............... H04W 56/001 370/329 |
| 2023/0275629 | A1* | 8/2023 | Wang | ............... H04W 24/02 375/262 |
| 2024/0235775 | A1* | 7/2024 | Wang | ............... H04B 7/0404 |
| 2024/0405827 | A1* | 12/2024 | Cui | ............... H04B 17/328 |

OTHER PUBLICATIONS

LG Electronics, "Discussion on interruption due to SRS antenna port switching", 3GPP TSG-RAN WG4 Meeting # 101-e, R4-2117837, pp. 1-5 (Year: 2021).*

MediaTek, "Discussion on SRS antenna port switching", 3GPP TSG-RAN WG4 Meeting # 101-e, R4-2118096, pp. 1-10 (Year: 2021).*

ZTE, "Discussion on SRS antenna port switching", 3GPP TSG-RAN WG4 Meeting # 101-bis-e, R4-2200739, pp. 1-3 (Year: 2022).*

* cited by examiner

ENHANCING THROUGHPUT PERFORMANCE IN MULTI-SIM MODEMS

FIELD OF TECHNOLOGY

The following relates to wireless communications, including enhancing throughput performance in multi-sim (MSIM) modems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

The UE may include a plurality of subscriber identity modules (SIMs). The UE may transmit sounding reference signals (SRSs) to a base station. Some SRS transmissions may be associated with a first SIM, and a scheduled communication (e.g., a tune away procedure) may be associated with a second SIM. However, some SRS transmissions may conflict with the scheduled communication at one or more antennas at the UE.

SUMMARY

The described techniques relate to improved techniques, devices, and apparatuses that support enhancing throughput performance in multi-sim (MSIM) modems. The described techniques may enable a user equipment (UE) to reduce sounding reference signal (SRS) conflicts with a scheduled communication (e.g., a tune away procedure) and avoid suspending SRS transmissions by switching the set of antennas that the UE uses to transmit the SRS transmissions. For example, the UE may switch from transmitting first SRSs that conflict with the scheduled communication from a first set of antennas to a second set of antennas. That is, the conflict may be at the first set of antennas. The UE may be transmitting second SRSs using the second set of antennas, and the switching may cause the UE to transmit the second SRSs using the first set of antennas instead. The second SRSs may not conflict with the scheduled communication (e.g., due to using different resources than the first SRSs), which may enable the UE to transmit the second SRSs and the scheduled communication using the same first set of antennas. By switching the sets of antennas that the UE uses to transmit SRSs, the UE may avoid conflicts with the scheduled communication (e.g., a tune away procedure), and may avoid suspending SRS transmissions during the scheduled communication.

A method for wireless communication at a user equipment (UE) is described. The method may include receiving a first configuration for a first sounding reference signal associated with a first subscriber identity module of the UE, the first configuration identifying a first set of resources for the first sounding reference signal, where the UE includes a second subscriber identity module, transmitting, to a first wireless device from a first set of antennas of the UE, one or more first repetitions of the first sounding reference signal over a first portion of the first set of resources, and transmitting, to the first wireless device from a second set of antennas of the UE that are different from the first set of antennas, one or more second repetitions of the first sounding reference signal over a second portion of the first set of resources based on identifying a conflict of the first set of resources with a scheduled communication associated with the second subscriber identity module.

An apparatus for wireless communication at a UE is described. The apparatus may include a processor, memory coupled with the processor, and instructions stored in the memory. The instructions may be executable by the processor to cause the apparatus to receive a first configuration for a first sounding reference signal associated with a first subscriber identity module of the UE, the first configuration identifying a first set of resources for the first sounding reference signal, where the UE includes a second subscriber identity module, transmit, to a first wireless device from a first set of antennas of the UE, one or more first repetitions of the first sounding reference signal over a first portion of the first set of resources, and transmit, to the first wireless device from a second set of antennas of the UE that are different from the first set of antennas, one or more second repetitions of the first sounding reference signal over a second portion of the first set of resources based on identifying a conflict of the first set of resources with a scheduled communication associated with the second subscriber identity module.

Another apparatus for wireless communication at a UE is described. The apparatus may include means for receiving a first configuration for a first sounding reference signal associated with a first subscriber identity module of the UE, the first configuration identifying a first set of resources for the first sounding reference signal, where the UE includes a second subscriber identity module, means for transmitting, to a first wireless device from a first set of antennas of the UE, one or more first repetitions of the first sounding reference signal over a first portion of the first set of resources, and means for transmitting, to the first wireless device from a second set of antennas of the UE that are different from the first set of antennas, one or more second repetitions of the first sounding reference signal over a second portion of the first set of resources based on identifying a conflict of the first set of resources with a scheduled communication associated with the second subscriber identity module.

A non-transitory computer-readable medium storing code for wireless communication at a UE is described. The code may include instructions executable by a processor to receive a first configuration for a first sounding reference signal associated with a first subscriber identity module of the UE, the first configuration identifying a first set of resources for the first sounding reference signal, where the UE includes a second subscriber identity module, transmit, to a first wireless device from a first set of antennas of the UE, one or more first repetitions of the first sounding reference signal over a first portion of the first set of resources, and transmit, to the first wireless device from a second set of antennas of the UE that are different from the first set of antennas, one or more second repetitions of the first sounding reference signal over a second portion of the first set of resources based on identifying a conflict of the first set of resources with a scheduled communication associated with the second subscriber identity module.

Some examples of the method, apparatuses, and non-transitory computer-readable medium described herein may further include operations, features, means, or instructions for receiving a second configuration for a second sounding reference signal associated with the first subscriber identity module, the second configuration identifying a second set of resources for the second sounding reference signal, transmitting, to the first wireless device from the second set of antennas of the UE prior to identifying the conflict of the first set of resources with the scheduled communication associated with the second subscriber identity module, one or more first repetitions of the second sounding reference signal over a first portion of the second set of resources, and transmitting, to the first wireless device from the first set of antennas of the UE subsequent to identifying the conflict of the first set of resources with the scheduled communication associated with the second subscriber identity module, one or more second repetitions of the second sounding reference signal over a second portion of the second set of resources based on the identifying the conflict of the first set of resources with the scheduled communication using the second subscriber identity module.

In some examples of the method, apparatuses, and non-transitory computer-readable medium described herein, the first configuration for the first sounding reference signal associates the first sounding reference signal with a first set of antenna ports and the second sounding reference signal associates the second sounding reference signal with a second set of antenna ports.

In some examples of the method, apparatuses, and non-transitory computer-readable medium described herein, transmitting the one or more second repetitions of the first sounding reference signal over the second portion of the first set of resources from the second set of antennas may include operations, features, means, or instructions for switching an association of the first set of antenna ports from the first set of antennas to the second set of antennas and switching an association of the second set of antenna ports from the second set of antennas to the first set of antennas.

In some examples of the method, apparatuses, and non-transitory computer-readable medium described herein, the scheduled communication using the second subscriber identity module includes at least part of a measurement procedure for a radio access technology associated with the second subscriber identity module.

In some examples of the method, apparatuses, and non-transitory computer-readable medium described herein, the scheduled communication associated with the second subscriber identity module uses the first set of antennas of the UE.

In some examples of the method, apparatuses, and non-transitory computer-readable medium described herein, the scheduled communication associated with the second subscriber identity module includes a paging occasion associated with paging from a second wireless device.

In some examples of the method, apparatuses, and non-transitory computer-readable medium described herein, the first subscriber identity module may be in a connected mode and the second subscriber identity module may be in an idle mode.

Some examples of the method, apparatuses, and non-transitory computer-readable medium described herein may further include operations, features, means, or instructions for identifying a radio link failure or a cell handover associated with the first subscriber identity module, where the transmitting the one or more second repetitions of the first sounding reference signal to the first wireless device from the second set of antennas of the UE may be based on the identifying the radio link failure or the cell handover.

Some examples of the method, apparatuses, and non-transitory computer-readable medium described herein may further include operations, features, means, or instructions for identifying an out of service indication associated with the second subscriber identity module, where the transmitting the one or more second repetitions of the first sounding reference signal to the first wireless device from the second set of antennas of the UE may be based on the identifying the out of service indication.

DETAILED DESCRIPTION

Figure 1:
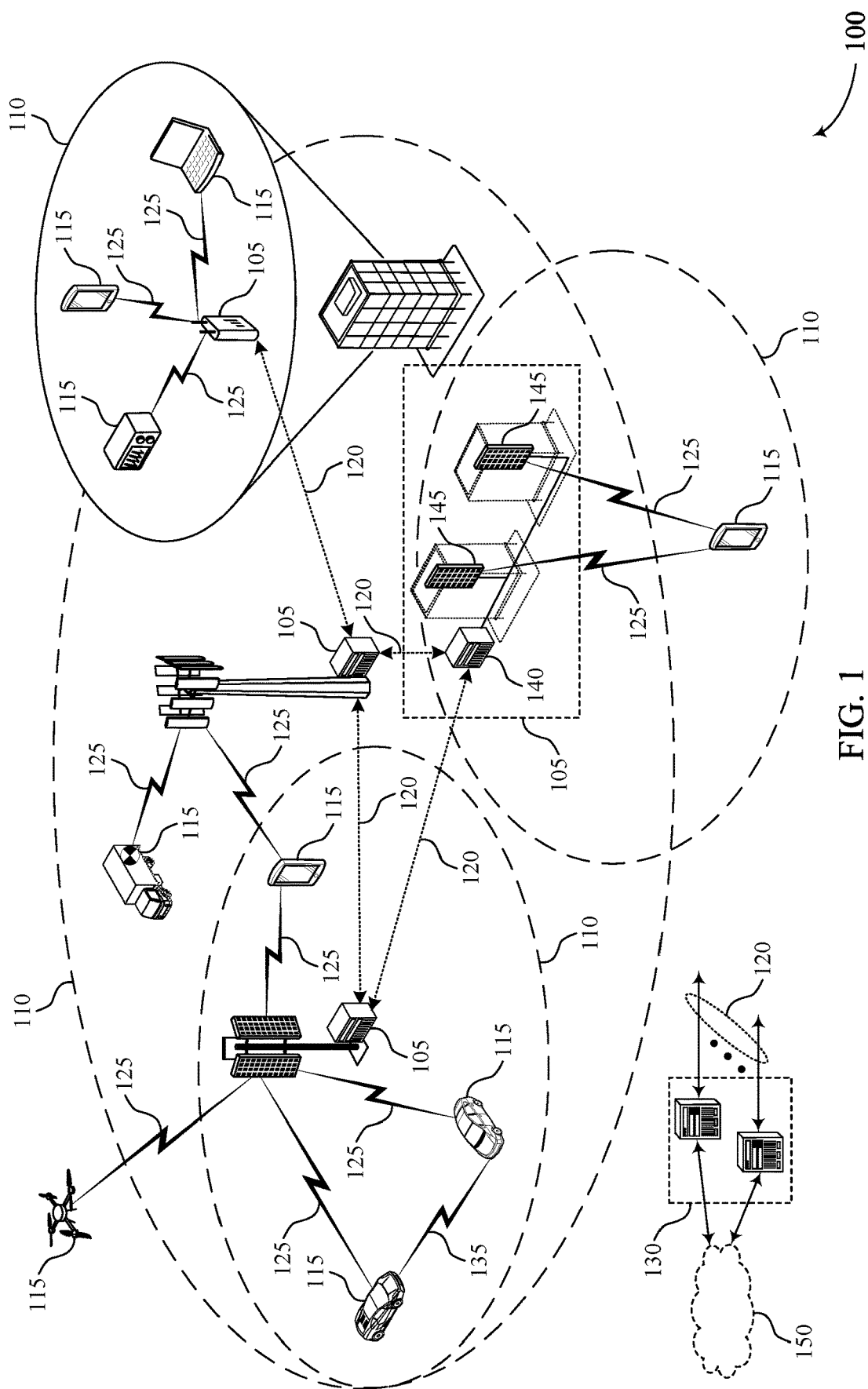
FIG. 1 illustrates an example of a wireless communications system that supports enhancing throughput performance in multi-sim (MSIM) modems in accordance with aspects of the present disclosure.

In some wireless communications systems, a user equipment (UE) may include a plurality of subscriber identity modules (SIMs) for communicating with one or more base stations using one or more radio access technologies (RATs). That is, a first SIM may be associated with a first RAT, and a second SIM may be associated with a second RAT. The UE may transmit one or more sounding reference signals (SRSs) to a first base station, which may be associated with the first SIM. The UE may be configured for a scheduled communication with a second base station (e.g., which may be the same as or different from the first base station), which may be associated with the second SIM. The scheduled communication may be associated with a different carrier, and may thus involve tuning away from a current carrier used for the one or more SRSs. The UE may be using a first set of antennas to both transmit one of the SRSs and communicate the scheduled communication. However, transmitting the SRSs and communicating the scheduled communication using the same first set of antennas may conflict in some cases (e.g., may conflict in time). In such cases, the UE may suspend SRS transmissions to allow the scheduled communication to occur. However, suspending SRS transmissions may impact the channel characterization by base station, and may result in improper power control or modulation and coding scheme (MCS), which may result in increased error rates (e.g., block error rate (BLER)), or control channel (e.g., physical downlink control channel (PDCCH)) or data channel (e.g., physical downlink shared channel (PDSCH)) decoding failures. Although the base station may lower the MCS to address the impact to decoding, the reduced MCS may impact throughput unnecessarily.

To reduce communication conflicts and to avoid suspending SRS transmissions, the UE may switch the set of antennas that the UE uses to transmit the SRS transmissions. For example, the UE may switch from transmitting first SRSs that conflict with a scheduled communication from the first set of antennas to a second set of antennas. The UE may be configured for transmitting second SRSs using the second set of antennas, and the switching may cause the UE to transmit the second SRSs using the first set of antennas instead. The second SRSs may not conflict with the scheduled communication (e.g., due to using different resources than the first SRSs), which may enable the UE to transmit the second SRSs and the scheduled communication using the same first set of antennas. By switching the sets of antennas that the UE uses to transmit SRSs, the UE may avoid conflicts with the scheduled communication (e.g., a tune away procedure), and may avoid suspending SRS transmissions during the scheduled communication.

Aspects of the disclosure are initially described in the context of wireless communications systems. Aspects of the disclosure are further illustrated by and described with reference to timelines, apparatus diagrams, system diagrams, and flowcharts that relate to enhancing throughput performance in MSIM modems.

FIG. 1 illustrates an example of a wireless communications system 100 that supports enhancing throughput performance in multi-sim modems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different RAT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular RAT (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different RATs.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A UE 115 may include a plurality of SIMs for communicating with one or more base stations 105 using one or more RATs (e.g., Wi-Fi, 5G NR, LTE, or the like). The UE 115 may transmit one or more SRSs to a first base station 105, which may be associated with the first SIM. The UE 115 may communicate a scheduled communication (e.g., a tune away procedure) with a second base station 105 (e.g., which may be the same as or different from the first base station 105), which may be associated with the second SIM. The UE 115 may be using a first set of antennas to both transmit one of the configured SRSs and communicate the scheduled communication. A UE 115 may reduce SRS conflicts with the scheduled communication by switching the set of antennas that the UE 115 uses to transmit the SRS transmissions. For example, the UE 115 may switch from transmitting first SRSs that conflict with the scheduled communication from a first set of antennas to a second set of antennas. That is, the conflict may be for the first set of antennas. The UE 115 may be transmitting second SRSs using the second set of antennas, and the switching may cause the UE 115 to transmit the second SRSs using the first set of antennas instead. The second SRSs may not conflict with the scheduled communication (e.g., due to using different resources than the first SRSs), which may enable the UE 115 to transmit the second SRSs and the scheduled communication using the same first set of antennas. By switching the sets of antennas that the UE 115 uses to transmit SRSs, the UE 115 may avoid conflicts with the scheduled communication (e.g., a tune away procedure), and may avoid suspending SRS transmissions during the scheduled communication.

Figure 2:
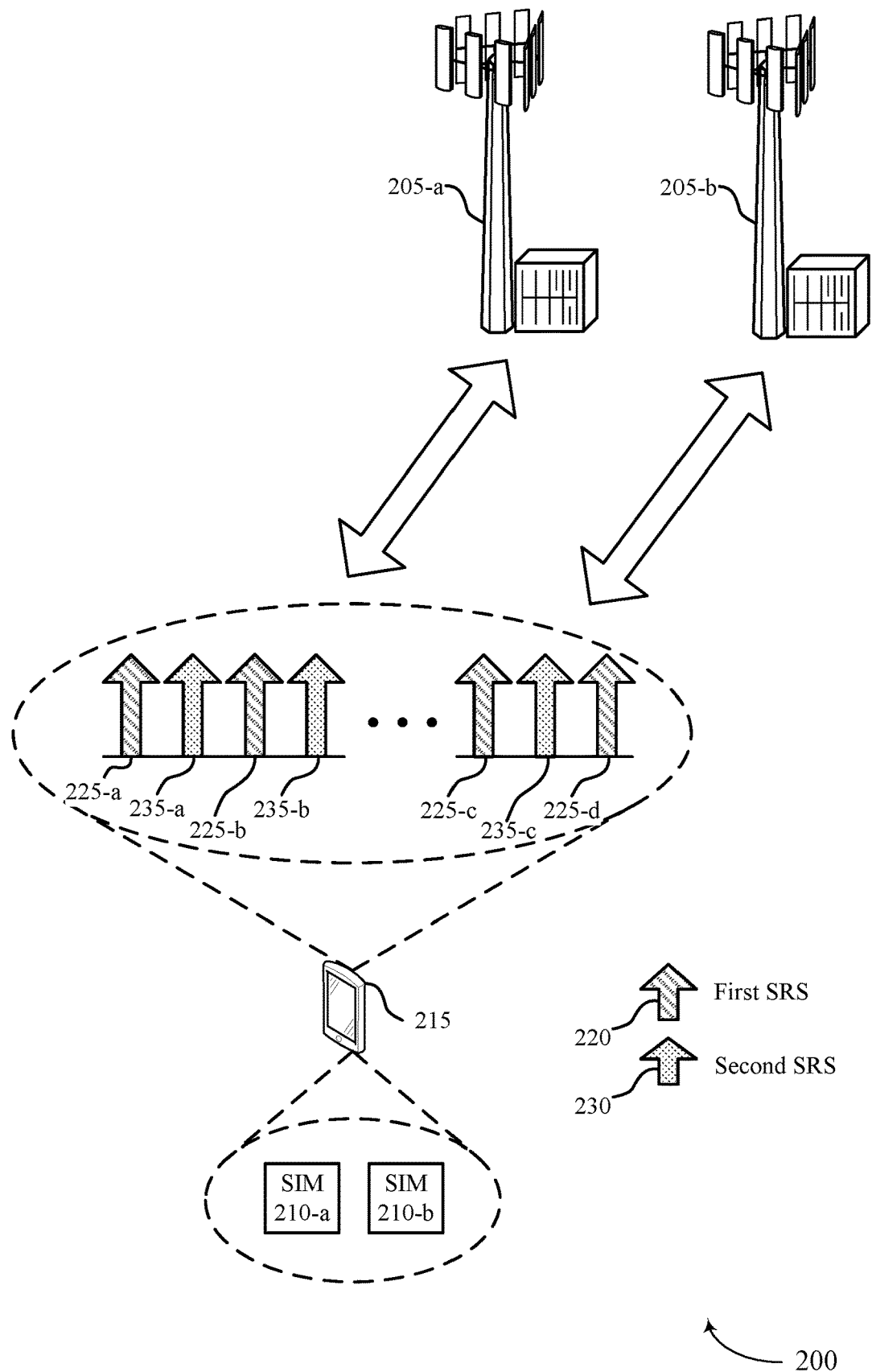
FIG. 2 illustrates an example of a wireless communications system that supports enhancing throughput performance in MSIM modems in accordance with aspects of the present disclosure.

FIG. 2 illustrates an example of a wireless communications system 200 that supports enhancing throughput performance in multi-sim (MSIM) modems in accordance with aspects of the present disclosure. The wireless communications system 200 may implement or be implemented by aspects of the wireless communications system 100 as described with reference to FIG. 1. For example, the wireless communications system 200 may include base stations 205 and UE 215, which may be examples of a base station 105 and a UE 115, or any other devices, as described herein. The wireless communications system 200 may support improvements to interference, processing, power consumption, and more efficient utilization of communication resources, among other benefits.

In some wireless communications systems, UE 215 may communicate with one or more base stations using one or more SIMs 210. Each SIM 210 may be associated with a subscription to an operator network (e.g., a public land mobile network (PLMN)). For example, UE 215 may communicate with base station 205-*a* using SIM 210-*a*, and UE 215 may communicate with base station 205-*b* using SIM 210-*b*. In some other examples, UE 215 may communicate with base station 205-*a* using SIM 210-*a* and SIM 210-*b*. In some cases, SIM 210-*a* may be a default data SIM (DDS), and SIM 210-*b* may be a non-DDS (nDDS). In such cases, SIM 210-*a* may be an active SIM (e.g., that is, may be in a connected mode), and SIM 210-*b* may be an idle SIM (e.g., may be camped in an idle mode).

UE 215 may be an MSIM device, and each SIM 210 may support one or more RATs. Thus, in some cases UE 215 may be able to communicate using multiple RATs concurrently that are associated with different SIMs. For example, SIM 210-*a* may support Wi-Fi, LTE, 5G NR, NR/L, or the like, and SIM 210-*b* may support Wi-Fi, LTE, 5G NR, NR/L, or the like. Thus, for example, UE 215 may be capable of communicating using 5G NR using SIM 210-*a*, and LTE using SIM 210-*b*. For example, UE 215 may communicate with base station 205-*a* using SIM 210-*a* using 5G NR, and may communicate with base station 205-*b* using SIM 210-*b* using LTE.

UE 215 may use one or more antenna pairs to transmit signaling to a base station 205, receive signaling from a base station 205, or both. For example, UE 215 may transmit one or more SRSs to base station 205-*a* using one or more antenna pairs, and base station 205-*a* may be able to characterize a channel, estimate the channel quality, schedule a downlink transmission (e.g., a PDSCH transmission) using the received one or more SRSs. UE 215 may transmit the one or more SRSs periodically over SRS resources, and UE 215 may transmit a given SRS resource using a specific antenna pair. For example, each SRS may be configured for transmission using one or more antenna ports, and each antenna port may have an association (e.g., a default association) with a specific antenna. For example, UE 215 may be configured to transmit a first SRS 220 over a first configured set of SRS resources and a first antenna pair and a second SRS 230 over a second set of SRS resources and a second antenna pair. The sets of SRS resources may be configured with a periodicity. A periodicity of such transmissions may be an amount of time between occasions of the sets of SRS resources. For example, a periodicity for the first configured set of SRS resources may be the amount of time between SRS transmission 225-*a* and SRS transmission 225-*b* and a periodicity for the second configured set of SRS resources may be the amount of time between SRS transmission 235-*a* and SRS transmission 235-*b*. In some cases, the second configured set of SRS resources may be configured with the same periodicity, but a different offset. For example, the occasions of the second set of SRS resources for the second SRS 230 may be between the occasions of the first set of SRS resources. That is, UE 215 may transmit one of the two configured SRSs at half of the periodicity configured for each of the SRSs. Additionally, each SRS transmission (e.g., SRS transmission 225-*a*, SRS transmission 235-*a*, and so on) may be associated with a system frame number (SFN), which may each represent a frame for a transmission. For example, SRS transmission 225-*a* may be associated with SFN #0, SRS transmission 235-*a* may be associated with SFN #4, SRS transmission 225-*b* may be associated with SFN #8, and so on. In some cases, transmitting the one or more SRSs to base station 205-*a* may be associated with SIM 210-*a* (e.g., an active SIM or DDS).

UE 215 may use the same one or more antenna pairs for scheduled communications (e.g., tune away procedures, measurement procedures, or the like) associated with SIM 210-*b* (e.g., an idle SIM, which may use discontinuous reception (DRX) techniques for the tune away procedures, such as when receiving a paging message) as for SRS transmissions associated with the SIM 210-*a* (e.g., the active SIM). For example, UE 215 may use the one or more antenna pairs for a tune away procedure associated with SIM 210-*b*. UE 215 may perform tune away procedures where UE 215 tunes away from its serving base station/cell (e.g., a base station 205) and tunes to neighboring base station(s) 205/cell(s) to search for candidates for a potential handover, to monitor the neighbor(s) for channel performance measurements, to monitor for paging associated with a different subscriber (e.g., SIM), or a combination of these.

However, during tune away procedures using a same antenna pair as SRS transmissions associated with SIM 210-*a*, resources may conflict (e.g., at a radio frequency (RF) subsystem at UE 215), and UE 215 may suspend SRS transmissions on the antenna pair. This may negatively impact one or more of base stations 205 abilities to characterize a channel, estimate the channel quality, schedule a downlink transmission (e.g., a PDSCH transmission) using received SRSs. Thus, UE 215 may fail to decode PDSCH after the suspension of SRS transmissions. Additionally or alternatively, a PDSCH block error rate (BLER) may prevail until the tune away procedure is complete and SRS transmissions occur across some or all configured SRS resources at least once. Additionally or alternatively, after a duration of the PDSCH BLER, due to an outer loop for PDSCH BLER, a base station 205 may penalize and lower an MCS scheduled for a duration of PDSCH scheduling. In this way, such BLER and MCS penalization on MSIM devices may negatively impact data throughput (e.g., throughput impact may be 30% to 40%, or any other amount, for stationary good RF channel conditions).

To reduce resource conflicts and suspension of SRS transmissions, UE 215 may switch antenna pairs for the conflicting resource (e.g., Tx to RF antennas which may not have conflicts during a tune away procedure). That is, UE 215 may reduce SRS conflicts with a tune away procedure and avoid suspending SRS transmissions by switching the set of antennas (e.g., antennas, antenna ports, or both) that UE 215 uses to transmit the SRS transmissions. For example, an SRS transmission 225-*c* may conflict with a scheduled communication using the second SIM 210-*b* (e.g., SRS transmission 225-*c*, scheduled for an occasion of a first set of SRS resources SRS #R0 from a first antenna pair, may be switched to a second antenna pair). UE 215 may switch subsequent SRS transmissions based on switching SRS transmission 225-*c*. For example, SRS transmission 235-*c* may be configured for transmission via a second antenna pair over an occasion of a second set of SRS resources SRS #R1, and may be switched from the second antenna pair to the first antenna pair. Each subsequent transmission (e.g., until any additional conflicts arise) may be switched for the first SRS 220 and the second SRS 230. For example, SRS transmission 225-*d* may be switched from the first antenna pair to the second antenna pair and addition SRS transmissions 235 may be switched from the second antenna pair to the first antenna pair. In some examples, switching antenna pairs for an SRS transmission may include switching an association of antenna ports and physical antennas. For example, UE 215 may switch an association of a first set of antenna ports from a first antenna pair to a second antenna pair, and may also switch an association of a second set of antenna ports from the second antenna pair to the first antenna pair. Switching SRS transmissions to different antenna pairs may cause a temporary disruption in the channel estimation by the base station (e.g., base station 205-*a*), but the base station may adapt MCS and outer loop to return the BLER to the desired state. By switching the sets of antennas that UE 215 uses to transmit SRSs, UE 215 may avoid conflicts with the tune away procedure, and may avoid suspending SRS transmissions during the tune away procedure.

Figure 3:
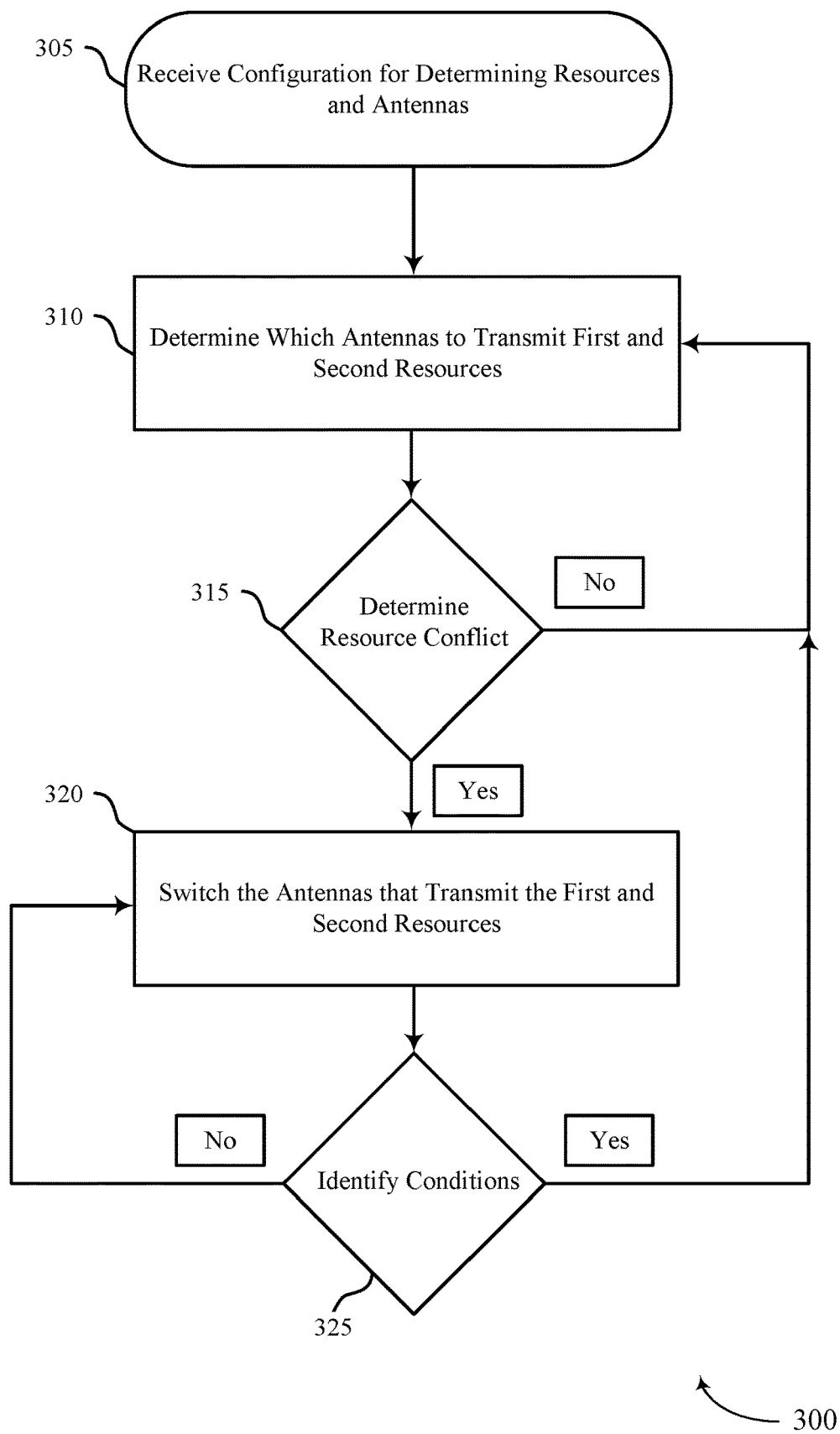
FIG. 3 illustrates an example of a flowchart that supports enhancing throughput performance in MSIM modems in accordance with aspects of the present disclosure.

FIG. 3 illustrates an example of a flowchart 300 that supports enhancing throughput performance in MSIM modems in accordance with aspects of the present disclosure. The flowchart 300 may implement or be implemented by aspects of the wireless communications system 100, wireless communications system 200, or a combination of these, as described with reference to FIGS. 1 and 2. In some examples, the flowchart 300 may include example operations associated with corresponding devices described with reference to FIGS. 1 and 2 (e.g., UEs 115, UE 215). In the following description of the flowchart 300, the operations may be performed in a different order than the example order shown, or at different times. Some operations may also be omitted from the flowchart 300, and other operations may be added to the flowchart 300.

A UE may implement an algorithm that may include one or more aspects of FIG. 3. For example, the algorithm may enable a UE to perform antenna switching for SRS resources on a first SIM (e.g., an active SIM, DDS SIM). SRS to antenna mapping may occur if a UE is performing DDS SIM reconfiguration on a same cell with SRS resources configured, if UE communications using the DDS SIM are handed over (HO) to a new base station or cell, if the UE experiences a radio link failure (RLF) recovery (e.g., for the DDS SIM), if there is a reselection procedure (e.g., for the nDDS SIM), if the UE experiences out of service (OOS) conditions with a base station or another wireless device (e.g., for the nDDS SIM), or a combination of these.

At 305, a UE may determine resources and antennas for transmitting SRSs. For example, the UE may receive one or more SRS configurations associated with the DDS SIM. The one or more configurations may configure resources for transmitting SRSs to a base station. The one or more configurations may associate the SRSs with antenna ports, antennas, or both.

At 310, the UE may determine a resource with which to transmit SRS to a base station (e.g., associated with a DDS SIM). The UE may use a first antenna pair (e.g., antenna 0 and antenna 1) to transmit a first SRS over a first set of SRS resources (e.g., SRS #R0). The UE may use a second antenna pair (e.g., antenna 2 and antenna 3) to transmit a second SRS over a second set of SRS resources (e.g., SRS #R1). The UE may additionally perform a tune away procedure for a duration that conflicts with one or more occasions of the first set of SRS resources, the tune away procedure associated with an nDDS SIM.

At 315, the UE may determine that the first set of SRS resources (e.g., SRS #R0) conflicts with the tune away procedure, and that a second set of SRS resources (e.g., SRS #R1) may not conflict with the tune away procedure. A tune away duration may impact SRS transmission for the first set of SRS resource (e.g., where the SRS transmission resource may otherwise be suspended to perform the tune away procedure) and may impact the first pair of antennas.

At 320, to avoid transmitting the first SRS on the first antenna pair (e.g., antenna 0 and antenna 1), which may cause the first SRS to be suspended during a conflict on the first antenna pair during the tune away procedure, the UE may switch antenna pairs for SRS transmissions. That is, the UE may transmit the first SRS over the first SRS resources (e.g., SRS #R0) using the second antenna pair (e.g., antenna 2 and antenna 3), which may not have a conflict during the tune away procedure, and may transmit the second SRS over the second SRS resources (e.g., SRS #R1) on the first antenna pair (e.g., antenna 0 and antenna 1), whose transmission occasions (e.g., SRS #R1) may not conflict with the tune away procedure. That is, the UE may maintain a same association of SRSs with sets of SRS resources, but switch antenna pairs for different SRSs so that there may be little or no conflicts with the tune away procedure at the first pair of antennas. The UE may maintain the switched antenna pairs for additional occasions of the first set of SRS resources and the second set of SRS resources. The UE may additionally or alternatively switch an association of antenna ports and antenna pairs, the antenna ports association being determined from the received one or more configurations.

Although described as a conflict between the first SRS and the nDDS communication over the first antenna pair (e.g., antenna 0 and antenna 1), it should be noted that the nDDS communication may conflict with the second antenna pair. That is, the nDDS (e.g., idle) SIM may be configured for a communication that conflicts with either SRS #R0 or SRS #R1, and the features described herein may apply to SRS #R0 or SRS #R1. For example, if the nDDS communication conflicts with either the first SRS or the second SRS over the second antenna pair (e.g., antenna 2 and antenna 3), the UE may switch the associations of the first SRS and second SRS to the first and second antenna pairs as described at 320. Further, the naming conventions of resources and antennas are used as examples, and any other naming conventions or numberings may be considered without affecting the inventiveness or features described herein.

At 325, the UE may identify one or more conditions to determine whether to switch antennas for SRS transmissions. For example, the UE may determine an HO or RLF associated with the active or DDS SIM, or may determine a reselection or OOS associated with the idle or nDDS SIM. If the UE does not identify an RLF or a cell HO associated with the active or DDS SIM, the UE may transmit SRS transmissions according to the switched configuration (e.g., may proceed to step 320). If the UE identifies an RLF or a cell HO associated with the active or DDS SIM, the UE may transmit SRS transmissions according to the original configuration or may determine further conflicts (e.g., may proceed to step 310). Additionally or alternatively, if the UE does not identify a reselection or an OOS indication associated with the idle or nDDS SIM, the UE may transmit SRS transmissions according to the switched configuration (e.g., may proceed to step 320). If the UE a reselection or an OOS indication associated with the idle or nDDS SIM, the UE may transmit SRS transmissions according to the original configuration or may determine further conflicts (e.g., may proceed to step 310).

When performing one or more portions of flowchart 300, a base station may configure the UE (e.g., an MSIM device) with an SRS configuration and a paging occasion (PO), and an SRS resource for a transmission may have an RF conflict that collides with at least a portion of a tune away duration. The UE may determine an nDDS cell change or PO change which may shift the tune away duration and cause a conflict with the SRS antennas, antenna ports, and SRS resources. Upon determining the conflict, the UE may switch the antennas with which the UE transmits different SRSs over the configured SRS resources, which may avoid the conflict with the tune away procedure.

Figure 4:
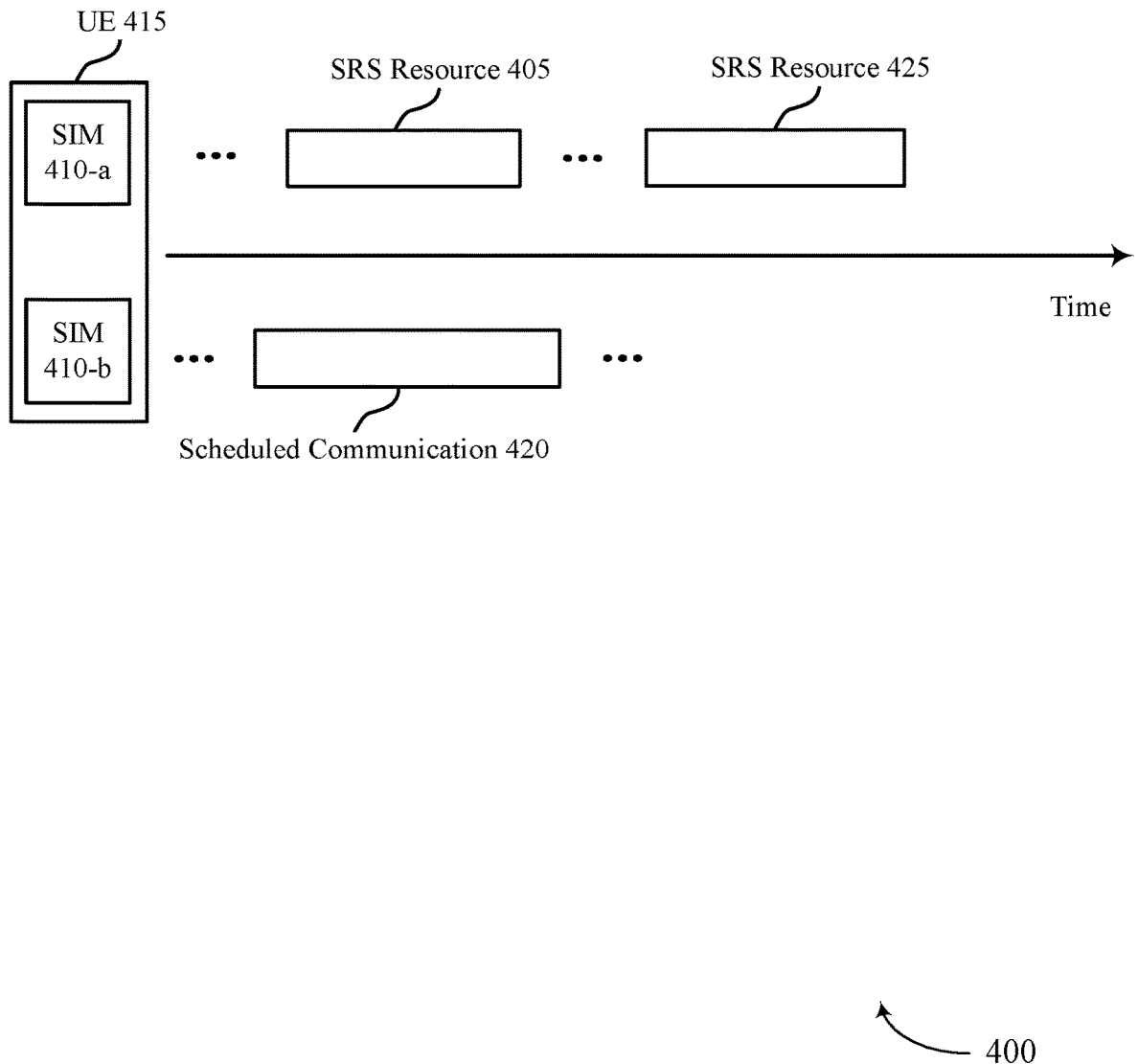
FIG. 4 illustrates an example of a timeline that supports enhancing throughput performance in MSIM modems in accordance with aspects of the present disclosure.

FIG. 4 illustrates examples of timeline 400 that supports enhancing throughput performance in MSIM modems in accordance with aspects of the present disclosure. The timeline 400 may implement or be implemented by aspects of the wireless communications system 100, wireless communications system 200, flowchart 300, or any combination of these, as described with reference to FIGS. 1, 2, and 3. For example, timeline 400 may illustrate enhanced throughput performance at UEs 115, UE 215, or both, which may be examples of corresponding devices described with reference to FIGS. 1 and 2.

Timeline 400 describes an example of SRS resources and scheduled communications (e.g., a tune away procedure) and their positions in time relative to each other. Relative timings are approximate and any other combination or configuration of timings may be considered.

UE 415 may transmit SRS signaling to a base station. Such SRS signaling may be associated with SIM 410-a, which may be an active SIM (e.g., DDS). UE 415 may additionally transmit, receive, or both (e.g., communicate) with the same base station or a different base station via scheduled communication 420. Scheduled communication 420 may be or may include a paging message during a PO. For example, a base station may transmit the paging message during the PO as a part of a tune away procedure.

In some cases, UE 415 may transmit SRS resource 405 using the same antenna pair as receiving or transmitting scheduled communication 420 (e.g., may overlap for at least a portion of time or frequency resources) (e.g., UE 415 may receive a paging message using a receive antenna of the antenna pair, and may transmit SRS resource 405 using a transmit antenna of the antenna pair). Communications associated with different SIMS (e.g., SIM 410-a, SIM 410-b) using overlapping resources and using the same antenna pair may result in a conflict, which may cause UE 415 to suspend transmission of SRS resource 405. To avoid the conflict and to avoid suspension of the transmission of SRS resource 405, UE 415 may switch to transmit SRS resource 405 on a different antenna than is used to communicate scheduled communication 420 (e.g., receive a paging message during a PO, communicate as a part of a tune away procedure). UE may switch resources with SRS resource 425. That is, because SRS resource 425 does not conflict with scheduled communication 420, UE 415 may transmit SRS resource 425 on the same antenna as scheduled communication 420.

By switching the antenna pairs that UE 415 uses to transmit SRS resource 405 and SRS resource 425, UE 415 may be able to transmit SRS resource 405, SRS resource 425, and communicate scheduled communication 420 without suspending transmitting SRS resource 405.

Figure 5:
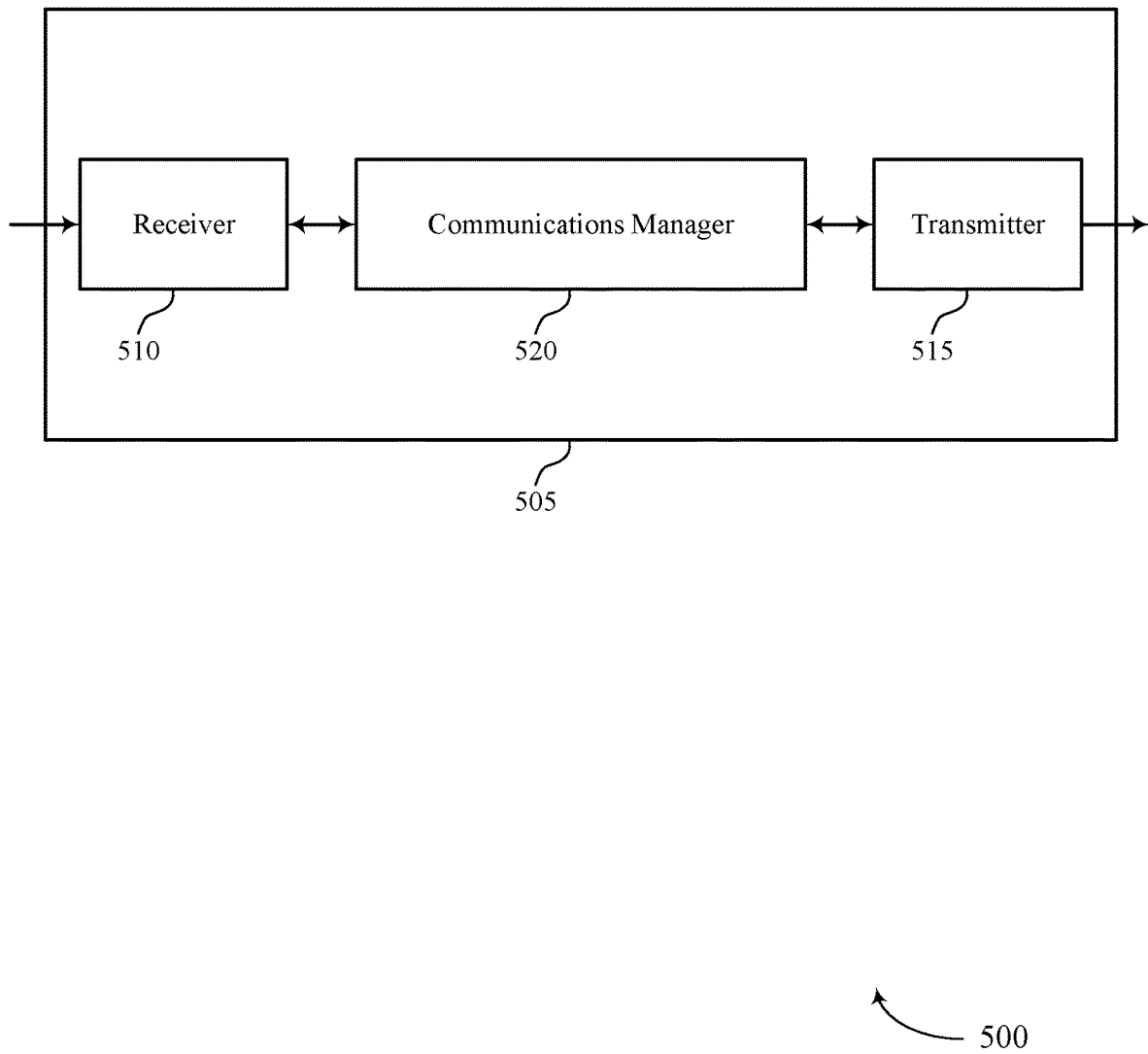
FIGS. 5 and 6 show block diagrams of devices that support enhancing throughput performance in MSIM modems in accordance with aspects of the present disclosure.

FIG. 5 shows a block diagram 500 of a device 505 that supports enhancing throughput performance in multi-sim modems in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to enhancing throughput performance in multi-sim modems). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to enhancing throughput performance in multi-sim modems). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of enhancing throughput performance in multi-sim modems as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving a first configuration for a first SRS associated with a first SIM of the UE, the first configuration identifying a first set of resources for the first SRS, where the UE includes a second SIM. The communications manager 520 may be configured as or otherwise support a means for transmitting, to a first wireless device from a first set of antennas of the UE, one or more first repetitions of the first SRS over a first portion of the first set of resources. The communications manager 520 may be configured as or otherwise support a means for transmitting, to the first wireless device from a second set of antennas of the UE that are different from the first set of antennas, one or more second repetitions of the first SRS over a second portion of the first set of resources based on identifying a conflict of the first set of resources with a scheduled communication associated with the second SIM.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources.

Figure 6:
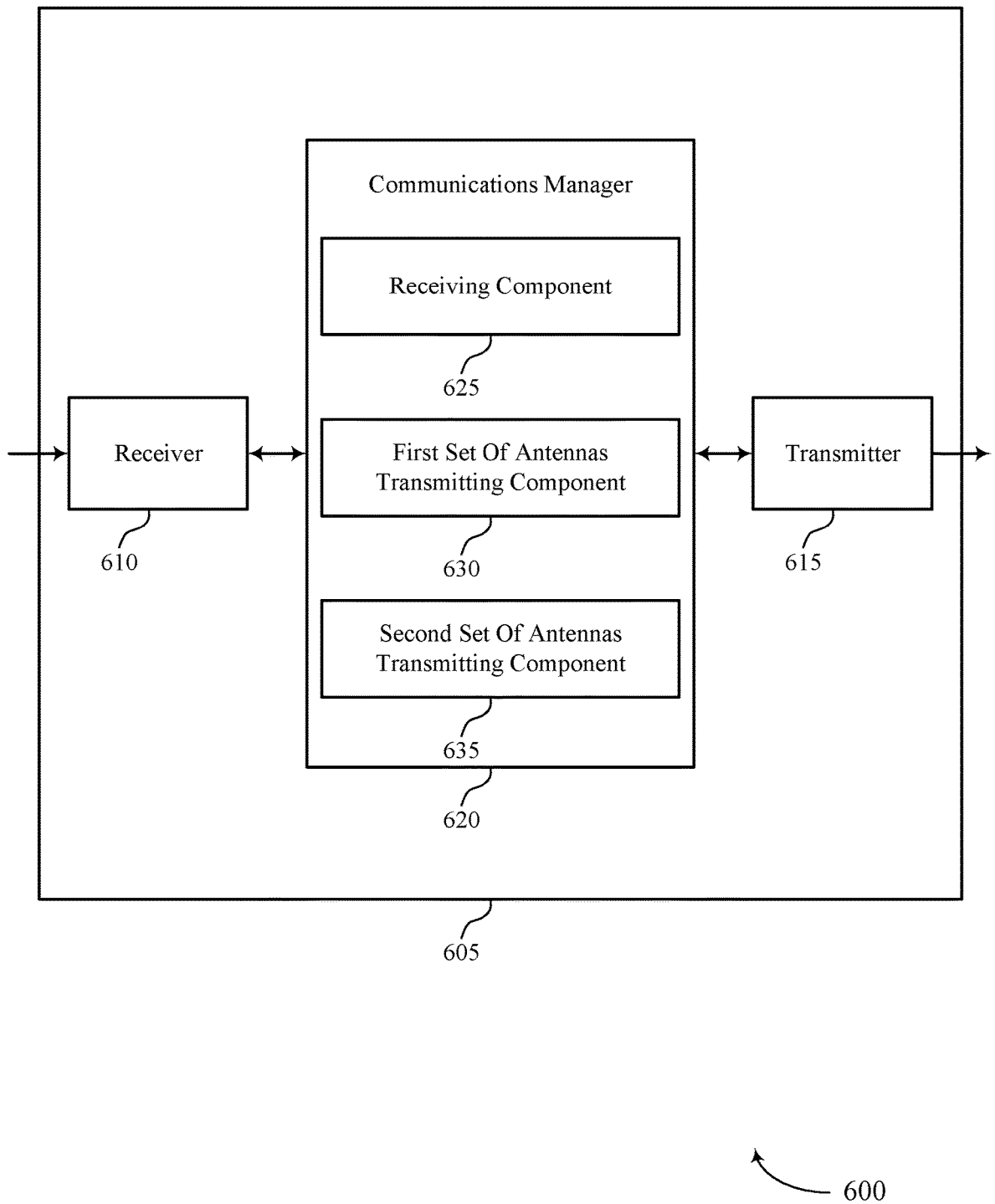

FIG. 6 shows a block diagram 600 of a device 605 that supports enhancing throughput performance in multi-sim modems in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to enhancing throughput performance in multi-sim modems). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to enhancing throughput performance in multi-sim modems). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of enhancing throughput performance in multi-sim modems as described herein. For example, the communications manager 620 may include a receiving component 625, a first set of antennas transmitting component 630, a second set of antennas transmitting component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The receiving component 625 may be configured as or otherwise support a means for receiving a first configuration for a first SRS associated with a first SIM of the UE, the first configuration identifying a first set of resources for the first SRS, where the UE includes a second SIM. The first set of antennas transmitting component 630 may be configured as or otherwise support a means for transmitting, to a first wireless device from a first set of antennas of the UE, one or more first repetitions of the first SRS over a first portion of the first set of resources. The second set of antennas transmitting component 635 may be configured as or otherwise support a means for transmitting, to the first wireless device from a second set of antennas of the UE that are different from the first set of antennas, one or more second repetitions of the first SRS over a second portion of the first set of resources based on identifying a conflict of the first set of resources with a scheduled communication associated with the second SIM.

Figure 7:
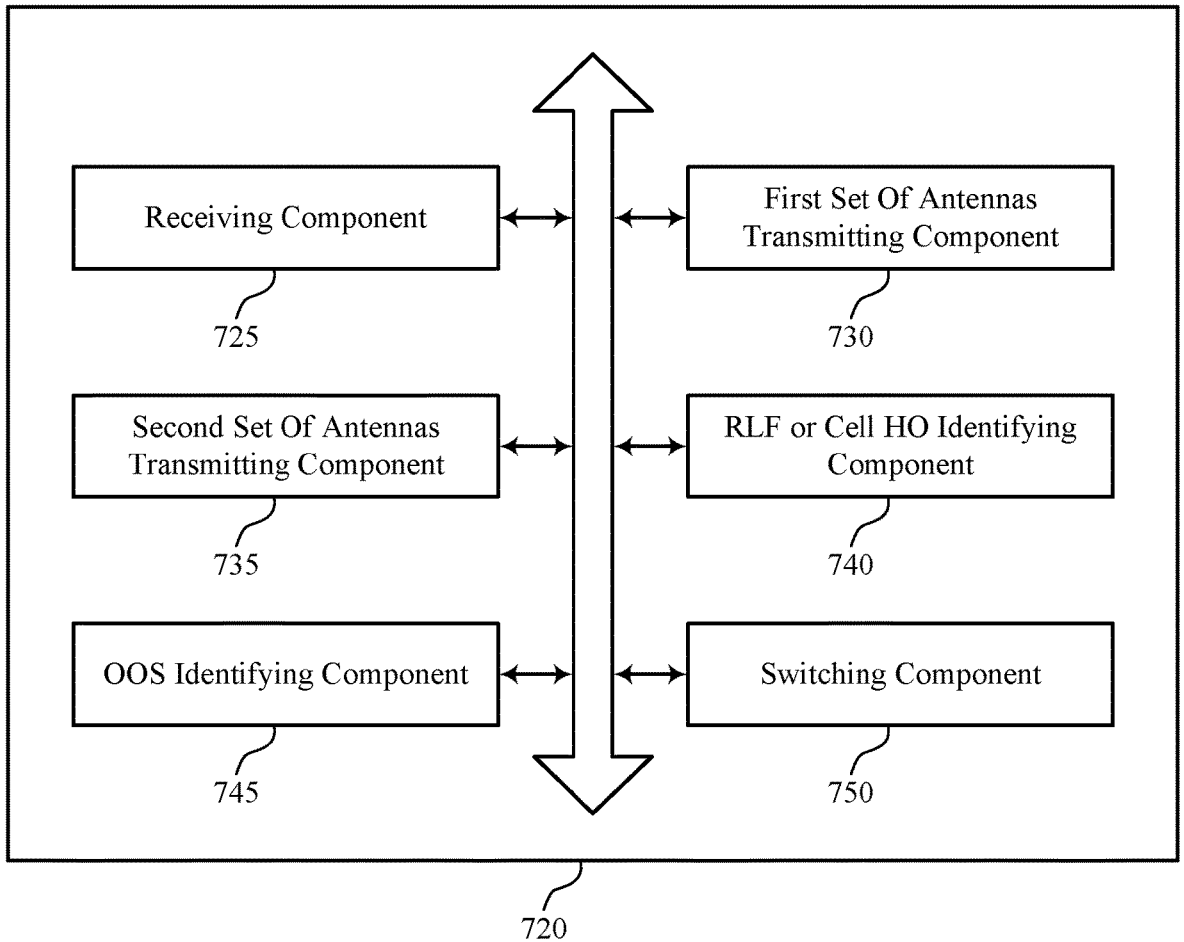
FIG. 7 shows a block diagram of a communications manager that supports enhancing throughput performance in MSIM modems in accordance with aspects of the present disclosure.

FIG. 7 shows a block diagram 700 of a communications manager 720 that supports enhancing throughput performance in multi-sim modems in accordance with aspects of the present disclosure. The communications manager 720 may be an example of aspects of a communications manager 520, a communications manager 620, or both, as described herein. The communications manager 720, or various components thereof, may be an example of means for performing various aspects of enhancing throughput performance in multi-sim modems as described herein. For example, the communications manager 720 may include a receiving component 725, a first set of antennas transmitting component 730, a second set of antennas transmitting component 735, an RLF or cell HO identifying component 740, a OOS identifying component 745, a switching component 750, or any combination thereof. Each of these components may communicate, directly or indirectly, with one another (e.g., via one or more buses).

The communications manager 720 may support wireless communication at a UE in accordance with examples as disclosed herein. The receiving component 725 may be configured as or otherwise support a means for receiving a first configuration for a first SRS associated with a first SIM of the UE, the first configuration identifying a first set of resources for the first SRS, where the UE includes a second SIM. The first set of antennas transmitting component 730 may be configured as or otherwise support a means for transmitting, to a first wireless device from a first set of antennas of the UE, one or more first repetitions of the first SRS over a first portion of the first set of resources. The second set of antennas transmitting component 735 may be configured as or otherwise support a means for transmitting, to the first wireless device from a second set of antennas of the UE that are different from the first set of antennas, one or more second repetitions of the first SRS over a second portion of the first set of resources based on identifying a conflict of the first set of resources with a scheduled communication associated with the second SIM.

In some examples, the receiving component 725 may be configured as or otherwise support a means for receiving a second configuration for a second SRS associated with the first SIM, the second configuration identifying a second set of resources for the second SRS. In some examples, the second set of antennas transmitting component 735 may be configured as or otherwise support a means for transmitting, to the first wireless device from the second set of antennas of the UE prior to identifying the conflict of the first set of resources with the scheduled communication associated with the second SIM, one or more first repetitions of the second SRS over a first portion of the second set of resources. In some examples, the first set of antennas transmitting component 730 may be configured as or otherwise support a means for transmitting, to the first wireless device from the first set of antennas of the UE subsequent to identifying the conflict of the first set of resources with the scheduled communication associated with the second SIM, one or more second repetitions of the second SRS over a second portion of the second set of resources based on the identifying the conflict of the first set of resources with the scheduled communication using the second SIM.

In some examples, the first configuration for the first SRS associates the first SRS with a first set of antenna ports and the second SRS associates the second SRS with a second set of antenna ports.

In some examples, to support transmitting the one or more second repetitions of the first SRS over the second portion of the first set of resources from the second set of antennas, the switching component 750 may be configured as or otherwise support a means for switching an association of the first set of antenna ports from the first set of antennas to the second set of antennas. In some examples, to support transmitting the one or more second repetitions of the first SRS over the second portion of the first set of resources from the second set of antennas, the switching component 750 may be configured as or otherwise support a means for switching an association of the second set of antenna ports from the second set of antennas to the first set of antennas.

In some examples, the scheduled communication using the second SIM includes at least part of a measurement procedure for a RAT associated with the second SIM.

In some examples, the scheduled communication associated with the second SIM uses the first set of antennas of the UE.

In some examples, the scheduled communication associated with the second SIM includes a PO associated with paging from a second wireless device.

In some examples, the first SIM is in a connected mode. In some examples, the second SIM is in an idle mode.

In some examples, the RLF or cell HO identifying component 740 may be configured as or otherwise support a means for identifying a RLF or a cell handover associated with the first SIM, where the transmitting the one or more second repetitions of the first SRS to the first wireless device from the second set of antennas of the UE is based on the identifying the RLF or the cell HO.

In some examples, the OOS identifying component 745 may be configured as or otherwise support a means for identifying an OOS indication associated with the second SIM, where the transmitting the one or more second repetitions of the first SRS to the first wireless device from the second set of antennas of the UE is based on the identifying the OOS indication.

Figure 8:
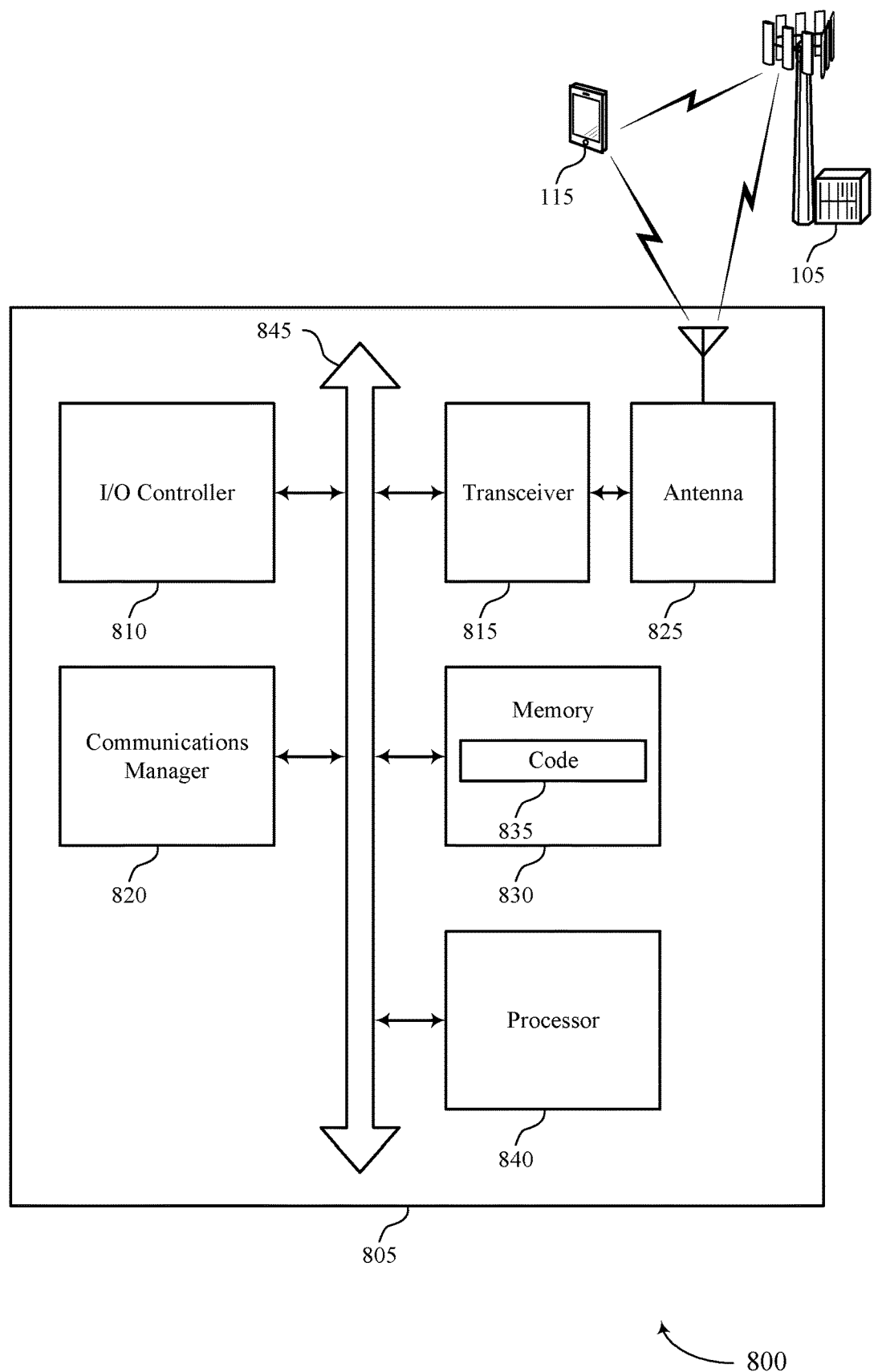
FIG. 8 shows a diagram of a system including a device that supports enhancing throughput performance in MSIM modems in accordance with aspects of the present disclosure.

FIG. 8 shows a diagram of a system 800 including a device 805 that supports enhancing throughput performance in multi-sim modems in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting enhancing throughput performance in multi-sim modems). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving a first configuration for a first SRS associated with a first SIM of the UE, the first configuration identifying a first set of resources for the first SRS, where the UE includes a second SIM. The communications manager 820 may be configured as or otherwise support a means for transmitting, to a first wireless device from a first set of antennas of the UE, one or more first repetitions of the first SRS over a first portion of the first set of resources. The communications manager 820 may be configured as or otherwise support a means for transmitting, to the first wireless device from a second set of antennas of the UE that are different from the first set of antennas, one or more second repetitions of the first SRS over a second portion of the first set of resources based on identifying a conflict of the first set of resources with a scheduled communication associated with the second SIM.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of enhancing throughput performance in multi-sim modems as described herein, or the processor 840 and the memory 830 may be otherwise configured to perform or support such operations.

Figure 9:
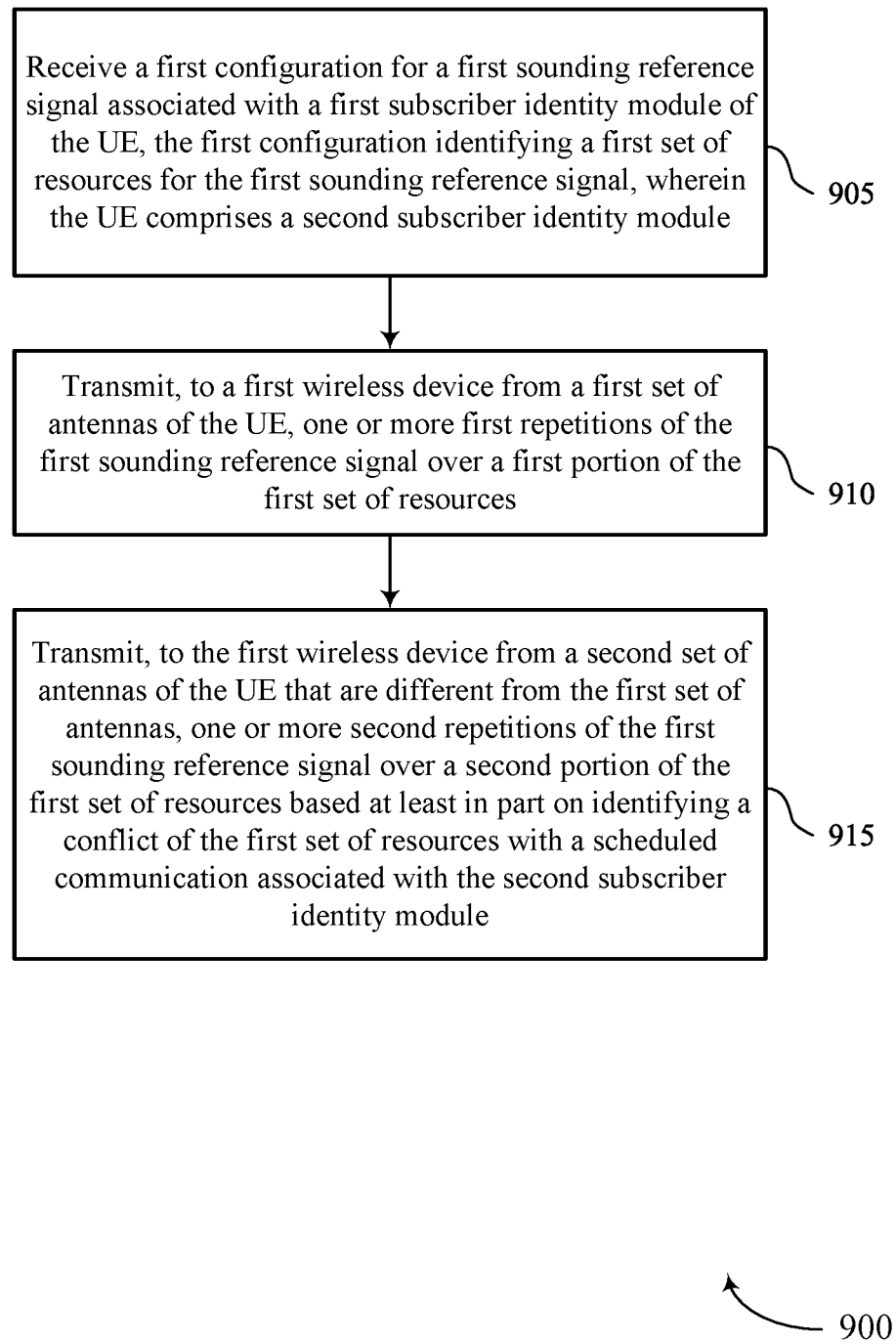
FIGS. 9 and 10 show flowcharts illustrating methods that support enhancing throughput performance in MSIM modems in accordance with aspects of the present disclosure.

FIG. 9 shows a flowchart illustrating a method 900 that supports enhancing throughput performance in multi-sim modems in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving a first configuration for a first SRS associated with a first SIM of the UE, the first configuration identifying a first set of resources for the first SRS, where the UE includes a second SIM. The operations of 905 may be performed in accordance with examples as disclosed herein. In some examples, aspects of the operations of 905 may be performed by a receiving component 725 as described with reference to FIG. 7.

At 910, the method may include transmitting, to a first wireless device from a first set of antennas of the UE, one or more first repetitions of the first SRS over a first portion of the first set of resources. The operations of 910 may be performed in accordance with examples as disclosed herein. In some examples, aspects of the operations of 910 may be performed by a first set of antennas transmitting component 730 as described with reference to FIG. 7.

At 915, the method may include transmitting, to the first wireless device from a second set of antennas of the UE that are different from the first set of antennas, one or more second repetitions of the first SRS over a second portion of the first set of resources based on identifying a conflict of the first set of resources with a scheduled communication associated with the second SIM. The operations of 915 may be performed in accordance with examples as disclosed herein. In some examples, aspects of the operations of 915 may be performed by a second set of antennas transmitting component 735 as described with reference to FIG. 7.

Figure 10:
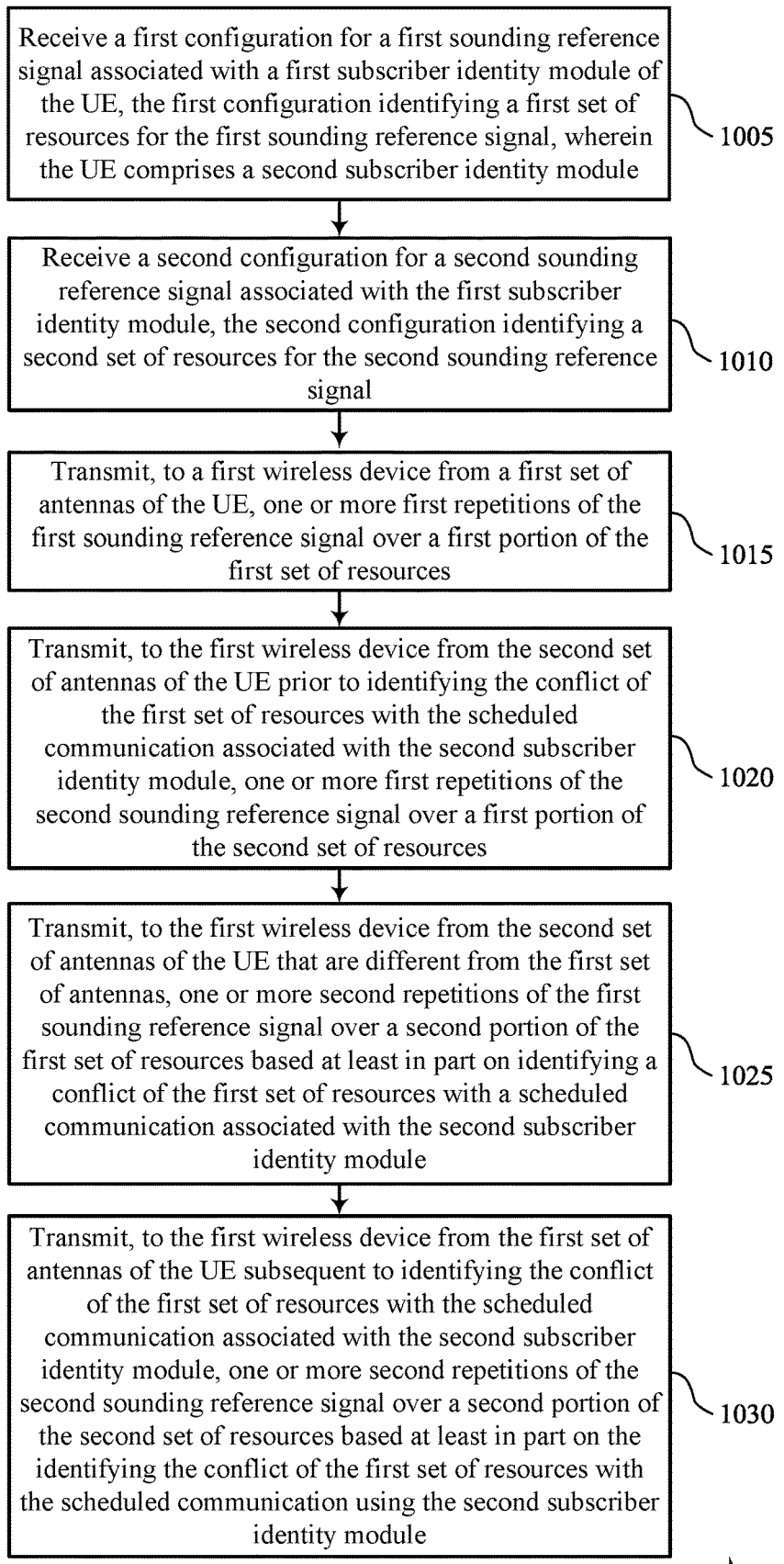

FIG. 10 shows a flowchart illustrating a method 1000 that supports enhancing throughput performance in multi-sim modems in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving a first configuration for a first SRS associated with a first SIM of the UE, the first configuration identifying a first set of resources for the first SRS, where the UE includes a second SIM. The operations of 1005 may be performed in accordance with examples as disclosed herein. In some examples, aspects of the operations of 1005 may be performed by a receiving component 725 as described with reference to FIG. 7.

At 1010, the method may include receiving a second configuration for a second SRS associated with the first SIM, the second configuration identifying a second set of resources for the second SRS. The operations of 1010 may be performed in accordance with examples as disclosed herein. In some examples, aspects of the operations of 1010 may be performed by a receiving component 725 as described with reference to FIG. 7.

At 1015, the method may include transmitting, to a first wireless device from a first set of antennas of the UE, one or more first repetitions of the first SRS over a first portion of the first set of resources. The operations of 1015 may be performed in accordance with examples as disclosed herein. In some examples, aspects of the operations of 1015 may be performed by a first set of antennas transmitting component 730 as described with reference to FIG. 7.

At 1020, the method may include transmitting, to the first wireless device from the second set of antennas of the UE prior to identifying the conflict of the first set of resources with the scheduled communication associated with the second SIM, one or more first repetitions of the second SRS over a first portion of the second set of resources. The operations of 1020 may be performed in accordance with examples as disclosed herein. In some examples, aspects of the operations of 1020 may be performed by a second set of antennas transmitting component 735 as described with reference to FIG. 7.

At 1025, the method may include transmitting, to the first wireless device from the second set of antennas of the UE that are different from the first set of antennas, one or more second repetitions of the first SRS over a second portion of the first set of resources based on identifying a conflict of the first set of resources with a scheduled communication associated with the second SIM. The operations of 1025 may be performed in accordance with examples as disclosed herein. In some examples, aspects of the operations of 1025 may be performed by a second set of antennas transmitting component 735 as described with reference to FIG. 7.

At 1030, the method may include transmitting, to the first wireless device from the first set of antennas of the UE subsequent to identifying the conflict of the first set of resources with the scheduled communication associated with the second SIM, one or more second repetitions of the second SRS over a second portion of the second set of resources based on the identifying the conflict of the first set of resources with the scheduled communication using the second SIM. The operations of 1030 may be performed in accordance with examples as disclosed herein. In some examples, aspects of the operations of 1030 may be performed by a first set of antennas transmitting component 730 as described with reference to FIG. 7.

The following provides an overview of aspects of the present disclosure:

Aspect 1: A method for wireless communication at a UE, comprising: receiving a first configuration for a first SRS associated with a first SIM of the UE, the first configuration identifying a first set of resources for the first SRS, wherein the UE comprises a second SIM; transmitting, to a first wireless device from a first set of antennas of the UE, one or more first repetitions of the first SRS over a first portion of the first set of resources; and transmitting, to the first wireless device from a second set of antennas of the UE that are different from the first set of antennas, one or more second repetitions of the first SRS over a second portion of the first set of resources based at least in part on identifying a conflict of the first set of resources with a scheduled communication associated with the second SIM.

Aspect 2: The method of aspect 1, further comprising: receiving a second configuration for a second SRS associated with the first SIM, the second configuration identifying a second set of resources for the second SRS; transmitting, to the first wireless device from the second set of antennas of the UE prior to identifying the conflict of the first set of resources with the scheduled communication associated with the second SIM, one or more first repetitions of the second SRS over a first portion of the second set of resources; and transmitting, to the first wireless device from the first set of antennas of the UE subsequent to identifying the conflict of the first set of resources with the scheduled communication associated with the second SIM, one or more second repetitions of the second SRS over a second portion of the second set of resources based at least in part on the identifying the conflict of the first set of resources with the scheduled communication using the second SIM.

Aspect 3: The method of aspect 2, wherein the first configuration for the first SRS associates the first SRS with a first set of antenna ports and the second SRS associates the second SRS with a second set of antenna ports.

Aspect 4: The method of aspect 3, wherein transmitting the one or more second repetitions of the first SRS over the second portion of the first set of resources from the second set of antennas comprises: switching an association of the first set of antenna ports from the first set of antennas to the second set of antennas; and switching an association of the second set of antenna ports from the second set of antennas to the first set of antennas.

Aspect 5: The method of any of aspects 1 through 4, wherein the scheduled communication using the second SIM comprises at least part of a measurement procedure for a RAT associated with the second SIM.

Aspect 6: The method of any of aspects 1 through 5, wherein the scheduled communication associated with the second SIM uses the first set of antennas of the UE.

Aspect 7: The method of any of aspects 1 through 6, wherein the scheduled communication associated with the second SIM comprises a PO associated with paging from a second wireless device.

Aspect 8: The method of any of aspects 1 through 7, wherein the first SIM is in a connected mode, and the second SIM is in an idle mode.

Aspect 9: The method of any of aspects 1 through 8, further comprising: identifying a RLF or a cell HO associated with the first SIM, wherein the transmitting the one or more second repetitions of the first SRS to the first wireless device from the second set of antennas of the UE is based at least in part on the identifying the RLF or the cell HO.

Aspect 10: The method of any of aspects 1 through 9, further comprising: identifying an OOS indication associated with the second SIM, wherein the transmitting the one or more second repetitions of the first SRS to the first wireless device from the second set of antennas of the UE is based at least in part on the identifying the OOS indication.

Aspect 11: An apparatus for wireless communication at a UE, comprising a processor; memory coupled with the processor; and instructions stored in the memory and executable by the processor to cause the apparatus to perform a method of any of aspects 1 through 10.

Aspect 12: An apparatus for wireless communication at a UE, comprising at least one means for performing a method of any of aspects 1 through 10.

Aspect 13: A non-transitory computer-readable medium storing code for wireless communication at a UE, the code comprising instructions executable by a processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication by a user equipment (UE), comprising:
   receiving a first configuration, the first configuration identifying a first set of resources;
   transmitting, to a first wireless device from a first set of antennas of the UE, one or more first repetitions of a first sounding reference signal via a first portion of the first set of resources;
   identifying a time conflict between the first set of resources and a second set of resources;
   switching, based at least in part on the time conflict, from the first set of antennas to a second set of antennas of the UE that are different from the first set of antennas; and
   transmitting, from the second set of antennas and to the first wireless device, one or more second repetitions of the first sounding reference signal via a second portion of the first set of resources based at least in part on the switching.

2. The method of claim 1, further comprising:
   receiving a second configuration, the second configuration identifying a third set of resources;
   transmitting, to the first wireless device from the second set of antennas of the UE prior to identifying the time conflict between the first set of resources and the second set of resources, one or more first repetitions of a second sounding reference signal via a first portion of the third set of resources; and
   transmitting, to the first wireless device from the first set of antennas of the UE subsequent to identifying the time conflict between the first set of resources and the second set of resources, one or more second repetitions of the second sounding reference signal via a second portion of the third set of resources based at least in part on the time conflict between the first set of resources and the second set of resources.

3. The method of claim 2, wherein the first configuration associates the first sounding reference signal with a first set of antenna ports and the second configuration associates the second sounding reference signal with a second set of antenna ports.

4. The method of claim 3, wherein switching from the first set of antennas to the second set of antennas to transmit the one or more second repetitions of the first sounding reference signal via the second portion of the first set of resources comprises:
   switching an association of the first set of antenna ports from the first set of antennas to the second set of antennas; and switching an association of the second set of antenna ports from the second set of antennas to the first set of antennas.

5. The method of claim 1, wherein a scheduled communication via the second set of resources comprises at least part of a measurement procedure associated with a radio access technology.

6. The method of claim 1, wherein a scheduled communication via the second set of resources uses the first set of antennas of the UE.

7. The method of claim 1, wherein a scheduled communication via the second set of resources comprises a paging occasion associated with paging from a second wireless device.

8. The method of claim 1, wherein a first subscriber identity module associated with the first set of resources is in a connected mode, and a second subscriber identity module associated with the second set of resources is in an idle mode.

9. The method of claim 1, further comprising:
identifying a radio link failure or a cell handover, wherein the switching from the first set of antennas to the second set of antennas to transmit the one or more second repetitions of the first sounding reference signal to the first wireless device is based at least in part on the identifying the radio link failure or the cell handover.

10. The method of claim 1, further comprising:
identifying an out of service indication, wherein the switching from the first set of antennas to the second set of antennas to transmit the one or more second repetitions of the first sounding reference signal to the first wireless device is based at least in part on the identifying the out of service indication.

11. A user equipment (UE), comprising:
one or more transceivers;
one or more processors;
one or more memories coupled with the one or more processors; and
instructions stored in the one or more memories and executable by the one or more processors to cause the UE to:
receive, via the one or more transceivers, a first configuration, the first configuration identifying a first set of resources;
transmit, via the one or more transceivers and to a first wireless device from a first set of antennas of the UE, one or more first repetitions of a first sounding reference signal via a first portion of the first set of resources;
identify a time conflict between the first set of resources and a second set of resources;
switch, based at least in part on the time conflict, from the first set of antennas to a second set of antennas of the UE that are different from the first set of antennas; and
transmit, from the second set of antennas and to the first wireless device, one or more second repetitions of the first sounding reference signal via a second portion of the first set of resources based at least in part on the switching.

12. The UE of claim 11, wherein the instructions are further executable by the one or more processors to cause the UE to:
receive, via the one or more transceivers, a second configuration, the second configuration identifying a third set of resources;

transmit, via the one or more transceivers and to the first wireless device from the second set of antennas of the UE prior to identifying the time conflict between the first set of resources and the second set of resources, one or more first repetitions of a second sounding reference signal via a first portion of the third set of resources; and
transmit, via the one or more transceivers and to the first wireless device from the first set of antennas of the UE subsequent to identifying the time conflict between the first set of resources and the second set of resources, one or more second repetitions of the second sounding reference signal via a second portion of the third set of resources based at least in part on the time conflict between the first set of resources and the second set of resources.

13. The UE of claim 12, wherein the first configuration associates the first sounding reference signal with a first set of antenna ports and the second configuration associates the second sounding reference signal with a second set of antenna ports.

14. The UE of claim 13, wherein the instructions to switch from the first set of antennas to the second set of antennas to transmit the one or more second repetitions of the first sounding reference signal via the second portion of the first set of resources are executable by the one or more processors to cause the UE to:
switch an association of the first set of antenna ports from the first set of antennas to the second set of antennas; and
switch an association of the second set of antenna ports from the second set of antennas to the first set of antennas.

15. The UE of claim 11, wherein a scheduled communication via the second set of resources comprises at least part of a measurement procedure associated with a radio access technology.

16. The UE of claim 11, wherein a scheduled communication via the second set of resources uses the first set of antennas of the UE.

17. The UE of claim 11, wherein a scheduled communication via the second set of resources comprises a paging occasion associated with paging from a second wireless device.

18. The UE of claim 11, wherein a first subscriber identity module associated with the first set of resources is in a connected mode, and a second subscriber identity module associated with the second set of resources is in an idle mode.

19. The UE of claim 11, wherein the instructions are further executable by the one or more processors to cause the UE to:
identify a radio link failure or a cell handover, wherein the switching from the first set of antennas to the second set of antennas to transmit the one or more second repetitions of the first sounding reference signal to the first wireless device is based at least in part on the identifying the radio link failure or the cell handover.

20. The UE of claim 11, wherein the instructions are further executable by the one or more processors to cause the UE to:
identify an out of service indication, wherein the switching from the first set of antennas to the second set of antennas to transmit the one or more second repetitions of the first sounding reference signal to the first wireless device is based at least in part on the identifying the out of service indication.

21. An apparatus for wireless communication by a user equipment (UE), comprising:
- means for receiving a first configuration, the first configuration identifying a first set of resources;
- means for transmitting, to a first wireless device from a first set of antennas of the UE, one or more first repetitions of a first sounding reference signal via a first portion of the first set of resources;
- means for identifying a time conflict between the first set of resources and a second set of resources;
- means for switching, based at least in part on the time conflict, from the first set of antennas to a second set of antennas of the UE that are different from the first set of antennas; and
- means for transmitting, from the second set of antennas and to the first wireless device, one or more second repetitions of the first sounding reference signal via a second portion of the first set of resources based at least in part on the switching.

22. The apparatus of claim 21, further comprising:
- means for receiving a second configuration, the second configuration identifying a third set of resources;
- means for transmitting, to the first wireless device from the second set of antennas of the UE prior to identifying the time conflict between the first set of resources and the second set of resources, one or more first repetitions of a second sounding reference signal via a first portion of the third set of resources; and
- means for transmitting, to the first wireless device from the first set of antennas of the UE subsequent to identifying the time conflict between the first set of resources and the second set of resources, one or more second repetitions of the second sounding reference signal via a second portion of the third set of resources based at least in part on the time conflict between the first set of resources and the second set of resources.

23. The apparatus of claim 22, wherein the first configuration associates the first sounding reference signal with a first set of antenna ports and the second configuration associates the second sounding reference signal with a second set of antenna ports.

24. The apparatus of claim 23, wherein the means for switching from the first set of antennas to the second set of antennas to transmit the one or more second repetitions of the first sounding reference signal via the second portion of the first set of resources comprise:
- means for switching an association of the first set of antenna ports from the first set of antennas to the second set of antennas; and
- means for switching an association of the second set of antenna ports from the second set of antennas to the first set of antennas.

25. The apparatus of claim 21, wherein a scheduled communication via the second set of resources comprises at least part of a measurement procedure associated with a radio access technology.

26. The apparatus of claim 21, wherein a scheduled communication via the second set of resources uses the first set of antennas of the UE.

27. The apparatus of claim 21, wherein a scheduled communication via the second set of resources comprises a paging occasion associated with paging from a second wireless device.

28. The apparatus of claim 21, wherein a first subscriber identity module associated with the first set of resources is in a connected mode, and a second subscriber identity module associated with the second set of resources is in an idle mode.

29. The apparatus of claim 21, further comprising:
- means for identifying a radio link failure or a cell handover, wherein the switching from the first set of antennas to the second set of antennas to transmit the one or more second repetitions of the first sounding reference signal to the first wireless device is based at least in part on the identifying the radio link failure or the cell handover.

30. The apparatus of claim 21, further comprising:
- means for identifying an out of service indication, wherein the switching from the first set of antennas to the second set of antennas to transmit the one or more second repetitions of the first sounding reference signal to the first wireless device is based at least in part on the identifying the out of service indication.

* * * * *